United States Patent
Song et al.

(10) Patent No.: US 11,676,287 B2
(45) Date of Patent: Jun. 13, 2023

(54) REMOTE-CONTROLLED WEAPON SYSTEM IN MOVING PLATFORM AND MOVING TARGET TRACKING METHOD THEREOF

(71) Applicant: HANWHA AEROSPACE CO., LTD., Changwon-si (KR)

(72) Inventors: Jin Mo Song, Changwon-si (KR); Bong Kyung Suk, Changwon-si (KR); Jong Min Lee, Changwon-si (KR); Young Jin Seo, Changwon-si (KR)

(73) Assignee: HANWHA AEROSPACE CO.. LTD, Chonowon-ei (KR)

( * ) Notice: Subject to any disclaimer, the term of this patent is extended or adjusted under 35 U.S.C. 154(b) by 235 days.

(21) Appl. No.: 17/169,868

(22) Filed: Feb. 8, 2021

(65) Prior Publication Data
US 2022/0122271 A1 Apr. 21, 2022

(30) Foreign Application Priority Data
Oct. 21, 2020 (KR) ........................ 10-2020-0137079

(51) Int. Cl.
*G06T 7/73* (2017.01)
*G06T 7/246* (2017.01)
(Continued)

(52) U.S. Cl.
CPC ................ *G06T 7/246* (2017.01); *F41G 3/22* (2013.01); *G06T 7/73* (2017.01); *G06V 10/25* (2022.01);
(Continued)

(58) Field of Classification Search
CPC ........... G06T 7/20; G06T 7/246; G06T 7/248; G06T 7/70; G06T 7/73; G06T 7/74;
(Continued)

(56) References Cited

U.S. PATENT DOCUMENTS 9,390,506 B1 7/2016 Asvatha Narayanan et al. ........... G06T 7/0067
2002/0159637 A1* 10/2002 Echigo et al. ............ G06T 7/20
707/E17.121
(Continued)

FOREIGN PATENT DOCUMENTS

| KR | 10-2016-0113889 A | 10/2016 | ............. A61B 5/024 |
| KR | 10-2024163 B1 | 11/2019 | ........... H04B 10/116 |
| KR | 10-2077597 B1 | 2/2020 | ............... F41G 3/14 |

OTHER PUBLICATIONS

Shin et al., "Fast and Robust Object Tracking Using Tracking Failure Detection in Kernelized Correlation Filter," MDPI, Applied Sciences, vol. 10, No. 713, doi:10.3390, Jan. 2020, Total 13 pages.

*Primary Examiner* — Andrew W Johns
(74) *Attorney, Agent, or Firm* — Sughrue Mion, PLLC

(57) ABSTRACT

A remote-controlled weapon system, mounted in a moving platform, includes at least one processor that implements: a first posture calculator that calculates a first pixel movement amount corresponding to a posture change amount of a camera during a time interval between a first image and a second image, received after the first image; a second posture calculator that calculates a second pixel movement amount corresponding to a control command for changing a posture of the camera to match a moving target, detected from the second image, with an aiming point; and a region of interest (ROI) controller that calculates a third pixel movement amount corresponding to vibration of the camera based on the first pixel movement amount and the second pixel movement amount, and estimate a location of an ROI that is to be set on the moving target of the second image, based on the third pixel movement amount.

20 Claims, 12 Drawing Sheets

(51) Int. Cl.
  *F41G 3/22* (2006.01)
  *G06V 10/25* (2022.01)
  *H04N 23/695* (2023.01)
  *F41G 3/06* (2006.01)

(52) U.S. Cl.
  CPC ............. *H04N 23/695* (2023.01); *F41G 3/06* (2013.01); *G06T 2207/30212* (2013.01); *G06T 2207/30244* (2013.01)

(58) Field of Classification Search
  CPC ........... G06T 2207/30212; G06T 2207/30244; G06V 10/25; H04N 5/23299; H04N 23/695
  See application file for complete search history.

(56) References Cited

U.S. PATENT DOCUMENTS

| | | | |
|---|---|---|---|
| 2006/0005447 A1* | 1/2006 | Lenner et al. | F41G 3/06 42/111 |
| 2015/0253124 A1* | 9/2015 | Steffey | G01S 7/4808 356/614 |

* cited by examiner

I(T-1)    I(T)

REMOTE-CONTROLLED WEAPON SYSTEM IN MOVING PLATFORM AND MOVING TARGET TRACKING METHOD THEREOF

CROSS-REFERENCE TO THE RELATED APPLICATION

This application is based on and claims priority under 35 U.S.C. § 119 to Korean Patent Application No. 10-2020-0137079, filed on Oct. 21, 2020, in the Korean Intellectual Property Office, the disclosure of which is incorporated by reference herein in its entirety.

BACKGROUND

1. Field

Embodiments of the present disclosure relate to a remote-controlled weapon system, and more particularly, to a remote-controlled weapon system which is mounted in a moving platform and tracks a moving target.

2. Description of Related Art

A weapon system is a system in which a target is precisely fired at by manipulating an imaging apparatus and a weapon apparatus in a state in which a gunner is not exposed during a short-distance or a long-distance combat mission, allowing the gunner to accomplish the combat mission without losing their life.

SUMMARY

One or more embodiments of the present disclosure include a remote-controlled weapon system mounted in a moving platform that strongly tracks a moving target in an open field/a rough ground environment, and a target tracking method of the remote-controlled weapon system.

Additional aspects will be set forth in part in the description which follows and, in part, will be apparent from the description, or may be learned by practice of the presented embodiments of the disclosure.

According to one or more embodiments, a remote-controlled weapon system mounted in a moving platform is provided. The remote-controlled weapon system includes at least one processor that implements: a first posture calculator configured to calculate a first pixel movement amount corresponding to a posture change amount of a camera during a time interval between a first image and a second image, received after the first image; a second posture calculator configured to calculate a second pixel movement amount corresponding to a control command for changing a posture of the camera to match a moving target, detected from the second image, with an aiming point; and a region of interest (ROI) controller configured to calculate a third pixel movement amount corresponding to vibration of the camera based on the first pixel movement amount and the second pixel movement amount, and estimate a location of an ROI that is to be set on the moving target of the second image, based on the third pixel movement amount.

According to an embodiment, the second posture calculator is further configured to estimate a next location of the moving target based on a speed of the moving target, and calculate the second pixel movement amount corresponding to the control command such that the posture of the camera is changed to make the estimated next location of the moving target correspond to the aiming point.

According to an embodiment, the second posture calculator is further configured to receive an output of a driver configured to drive the camera in response to the control command, and adjust a pixel movement amount, which corresponds to the output of the driver, as the second pixel movement amount.

According to an embodiment, the first posture calculator is further configured to receive the posture change amount of the camera during the time interval between the first image and the second image from a posture sensor.

According to an embodiment, the first posture calculator is further configured to calculate a global movement of an image, calculated by registering at least a portion of the first image and the second image, as the first pixel movement amount.

According to an embodiment, the first posture calculator is further configured to calculate the first pixel movement amount by registering crop images of corresponding regions of the first image and the second image.

According to an embodiment, the ROI controller is further configured to estimate the location of the ROI that is to be set on the second image by adjusting a location of an ROI that is set on the first image by the third pixel movement amount, the third pixel movement amount corresponding to a difference between the first pixel movement amount and the second pixel movement amount.

According to an embodiment, the ROI controller is further configured to: based on the third pixel movement amount being equal to or less than a threshold value, estimate the location of the ROI that is set on the first image as the location of the ROI to be set on the second image, and based on the third pixel movement amount being greater than the threshold value, estimate a location calculated by adjusting the location of the ROI that is set on the first image by the third pixel movement amount as the location of the ROI to be set on the second image.

According to an embodiment, the controller is further configured to generate the first pixel movement amount and the second pixel movement amount by converting an amount of change in a direction angle of the camera into a displacement of a pixel.

According to one or more embodiments, a method of tracking a moving target, performed by a remote-controlled weapon system that includes a camera and that is mounted in a moving platform, is provided. The method includes: calculating a first pixel movement amount corresponding to a posture change amount of the camera during a time interval between a first image and a second image, that is obtained after the first image; calculating a second pixel movement amount corresponding to a control command for changing a posture of the camera to match, with an aiming point, the moving target, wherein the moving target is detected from the second image; calculating a third pixel movement amount corresponding to vibration of the camera based on the first pixel movement amount and the second pixel movement amount; and estimating a location of a region of interest (ROI) that is to be set on the moving target of the second image, based on the third pixel movement amount.

According to an embodiment, the calculating of the second pixel movement amount includes estimating a next location of the moving target based on a speed of the moving target, and calculating the second pixel movement amount, which corresponds to the control command, such that the posture of the camera is changed to match the estimated next location of the moving target with the aiming point.

According to an embodiment, the calculating of the second pixel movement amount includes receiving an output of a driver configured to drive the camera in response to the control command, and adjusting a pixel movement amount corresponding to the output of the driver as the second pixel movement amount.

According to an embodiment, the calculating of the first pixel movement amount includes receiving, from a posture sensor, the posture change amount of the camera during the time interval between the first image and the second image.

According to an embodiment, the calculating of the first pixel movement amount includes calculating, by registering at least a portion of the first image and the second image, a global movement of an image as the first pixel movement amount.

According to an embodiment, the calculating of the first pixel movement amount includes calculating the global movement by registering crop images of corresponding regions of the first image and the second image.

According to an embodiment, the estimating of the location of the ROI includes estimating the location of the ROI that is to be set on the second image by adjusting a location of an ROI that is set on the first image by the third pixel movement amount, the third pixel movement amount corresponding to a difference between the first pixel movement amount and the second pixel movement amount.

According to an embodiment, the estimating of the location of the ROI includes based on determining the third pixel movement amount being equal to or less than a threshold value, estimating the location of the ROI that is set on the first image as the location of the ROI to be set on the second image.

According to an embodiment, the estimating of the location of the ROI includes based on determining the third pixel movement amount being greater than a threshold value, estimating a location calculated by adjusting the location of the ROI that is set on the first image by the third pixel movement amount as the location of the ROI to be set on the second image.

According to an embodiment, the calculating the first pixel movement amount and the calculating the second pixel movement amount include converting an amount change in a direction angle of the camera into a displacement of a pixel to generate the first pixel movement amount and the second pixel movement amount, respectively.

According to one or more embodiments, a non-transitory computer-readable medium storing computer code is provided. The computer code is configured to, when executed by at least one processor of a remote-controlled weapon system that is mounted in a moving platform, cause the at least one processor to: calculate a first pixel movement amount corresponding to a posture change amount of a camera, of the remote-controlled weapon system, during a time interval between a first image and a second image, that is obtained after the first image; calculate a second pixel movement amount corresponding to a control command for changing a posture of the camera to match, with an aiming point, a moving target detected from the second image; calculate a third pixel movement amount corresponding to vibration of the camera based on the first pixel movement amount and the second pixel movement amount; and estimate a location of a region of interest (ROI) that is to be set on the moving target of the second image, based on the third pixel movement amount.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
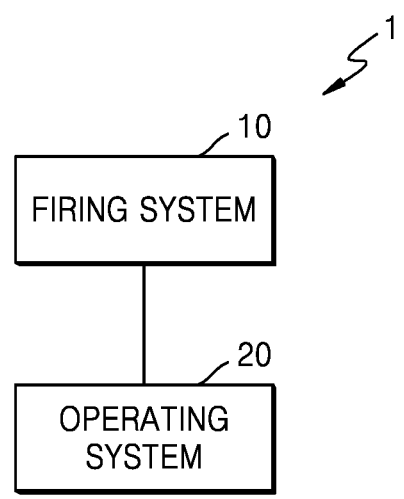
FIG. 1 is a schematic block diagram of a remote-controlled weapon system according to an embodiment.

Reference will now be made in detail to embodiments of the present disclosure, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The following merely illustrates aspects of the disclosure. It will thus be appreciated that one of ordinary skill in the art will be able to devise various arrangements which, although not explicitly described or shown herein, embody aspects of the disclosure and are included within its spirit and scope. Furthermore, all examples and conditional language recited herein are principally intended expressly to be only for pedagogical purposes and to aid the reader in understanding the principles of the disclosure and the concepts contributed by the inventors to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Functions of various devices that are illustrated in drawings including a function block denoted as a processor or as a similar concept with the processor, can be provided not only with specific hardware but also general hardware in which related software may be executed. When these functions are provided by the processor, the functions may be provided by a singular specific processor, a singular sharable processor, or plural processors in which sharing between the plural processors is possible. Also, usage of terms such as a processor, a controller, or the like should not be construed as being limited to hardware capable of executing software but should be construed as indirectly including digital signal processor (DSP) hardware, read-only memory (ROM), random-access memory (RAM), and non-volatile memory used for storing software. Other well-known conventional hardware devices may be included.

The purposes, features, and advantages described above will become more apparent through the detailed descriptions below with reference to the attached drawings. Also, while describing embodiments of the present disclosure, detailed descriptions about related well known functions or configurations that may blur points of the disclosure are omitted.

It will be further understood that when a part "includes" or "comprises" an element, unless otherwise defined, the part may further include other elements, not excluding the other elements.

When a certain embodiment may be implemented differently, a specific process order may be performed differently from the described order. For example, two consecutively described processes may be performed substantially at the same time or performed in an order opposite to the described order.

Figure 2A:
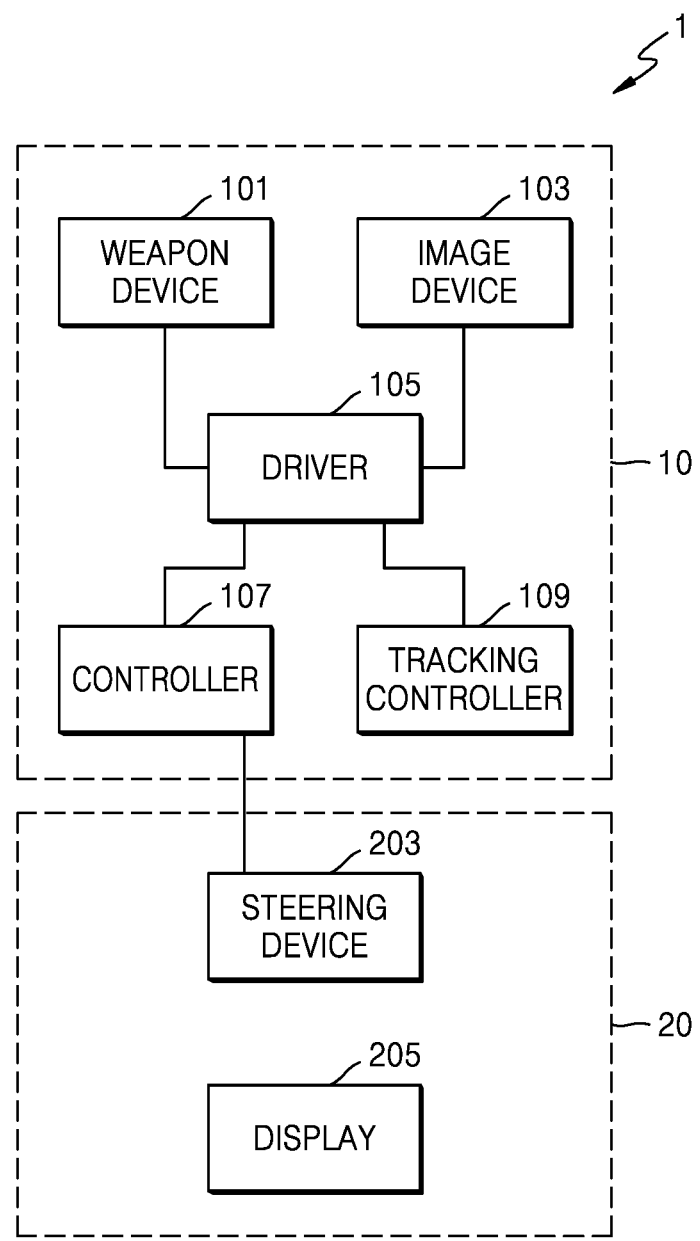
FIG. 2A is a schematic block diagram of the remote-controlled weapon system according to an embodiment.
Figure 2B:
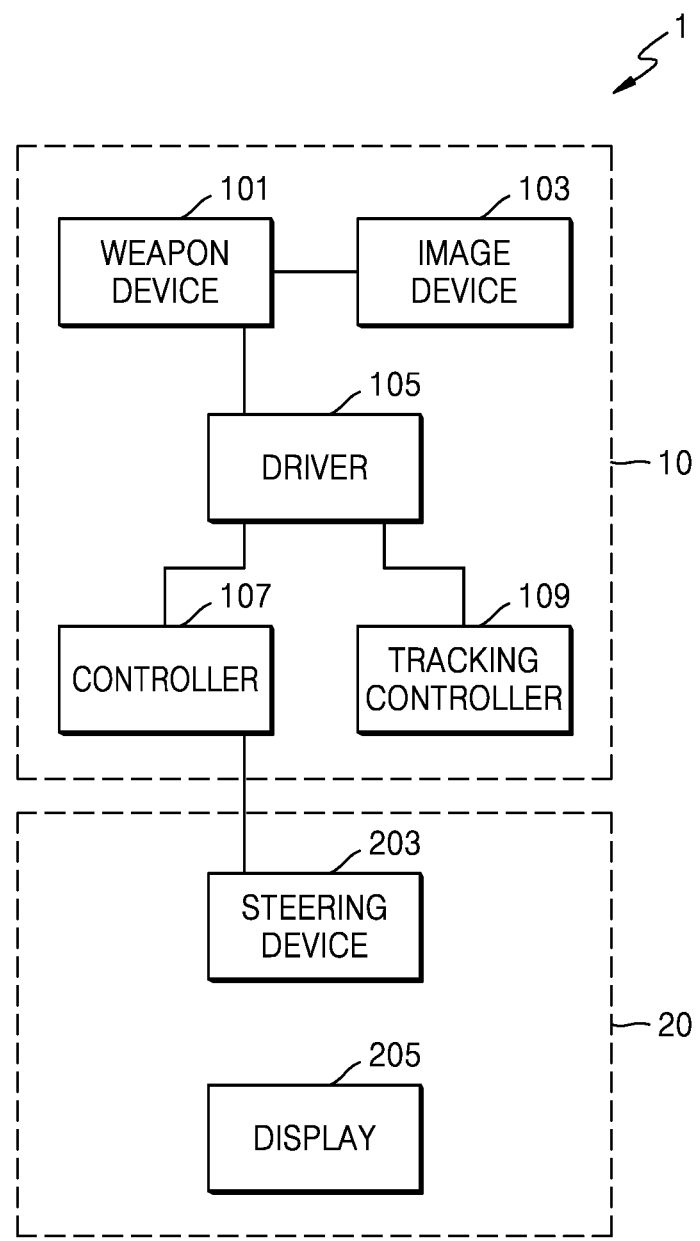
FIG. 2B is a schematic block diagram of the remote-controlled weapon system according to an embodiment.

FIGS. 1, 2A, and 2B are schematic block diagrams of a remote-controlled weapon system 1 according to an embodiment.

The remote-controlled weapon system 1 according to an embodiment may be mounted in a manned or unmanned moving platform such as a moving vehicle, robot, or warship, etc. operated in military operational environment, such as an unpaved road, a ground environment, such as a rough ground or an open field, or a marine environment and may track a moving target.

The remote-controlled weapon system 1 may communicate with a remote-control center and may track and fire at a front target. The remote-controlled weapon system 1 may perform remote communication with a command and control server of a remote-control center through mobile communication, and the command and control server may store/maintain/administer sensor/power consumption/driving data of the remote-controlled weapon system 1 based on a massive database (DB) system.

Referring to FIG. 1, the remote-controlled weapon system 1 may include a firing system 10 and an operating system 20. The firing system 10 may be mounted outside the moving platform and the operating system 20 may be mounted in the moving platform or a remote station. The firing system 10 and the operating system 20 may be connected wirelessly or in a wired manner through cables.

Referring to FIG. 2A, the firing system 10 may include a weapon device 101, an image device 103, a driver 105, a controller 107, and a tracking controller 109.

The weapon device 101 may include a firearm, a mount, a firing solenoid, and an ammunition supply device. The firearm may be mounted in the mount, may receive ammunition from the ammunition supply device, and may be incited by the firing solenoid and fire at a target.

In this specification, an object refers to an object in an image obtained by the image device 103, which may be fired at. Also, a target denotes an object from among objects, which may be fired at. That is, objects are a concept including a target, and an object, which is selected as the target from among the objects may be fired at.

The image device 103 may observe the target and measure a distance day and night.

The image device 103 may include at least one camera for observing the target day and night. The at least one camera may include a daytime camera and/or a night camera. The daytime camera and the night camera may be mutually coupled to a support member, and when the support member rotates in a horizontal direction and a vertical direction, the daytime camera and the night camera may simultaneously rotate in the same direction angle to change a posture in upward, downward, right, and left directions. Thus, in this specification, the image device 103 may be interchangeably referred to as a camera. For example, a posture of the image device 103 may denote a posture of the camera.

The daytime camera may generally operate in situations during the daytime and capture objects. However, it is not excluded that the daytime camera operates in situations at night. That is, the daytime camera may operate not only in the daytime situations, but also in the night situations, under control of the controller 107. According to an embodiment, the daytime camera may include a TV camera.

The night camera may generally operate and capture objects in the night situations. However, it is not excluded that the night camera operates in the daytime situations. That is, the night camera may operate not only in the night situations, but also in the daytime situations, under control of the controller 107. According to an embodiment, the night camera may include an infrared (IR) camera.

The image device 103 may further include a distance measuring device for measuring a distance. The distance measuring device may measure a distance between the firing system 10 and an object.

The driver 105 may include a motor and may adjust locations and directions of the camera and the firearm. The driver 105 may include a camera driver and a firearm driver.

The camera driver may drive the camera to adjust a distance between the camera and the firearm and may make a capturing direction of the camera and a firing direction of the firearm parallel with each other or cross each other for zero adjustment.

The firearm driver may include an elevation driver and a rotation driver. The elevation driver may drive the firearm in upward and downward directions to fire at a target in the upward and downward directions. Here, the upward and downward directions may denote upward and downward directions of a side toward which a gunpoint of the firearm is located. The rotation driver may drive the firearm in right and left directions to fire at a target in the right and left directions. Here, the right and left directions may denote right and left directions of a side toward which a gunpoint of the firearm is located.

The controller 107 may receive a control signal from a steering device 203 and control the driver 105 according to the control signal in order to control the firearm and the image device 103. When the control signal is a firing signal, the controller 107 may control a firing solenoid to fire the firearm. When the control signal is a firearm manipulation signal, the controller 107 may control the elevation driver and/or the rotation driver of the firearm driver such that the firearm moves in a certain direction of the upward, downward, right, and left directions. When the control signal is a camera manipulation signal, the controller 107 may control the camera driver such that the camera moves in a certain direction of the upward, downward, right, and left directions.

The tracking controller 109 may generate a control command for controlling the driver 105, by analyzing an image signal obtained from the camera. The tracking controller 109 may assign identification (ID) to a target from among objects in a received image, track the target by setting a region of interest (ROI) on the target, and position a center of the target at an aiming point. When the target deviates from the aiming point due to vibration (disturbance) of the camera, such as shaking/trembling of the camera (hereinafter, referred to as "vibration of the camera"), the tracking controller 109 may output, to the camera driver, a control signal corresponding to a control command for changing a posture of the camera to position the target at the aiming point. The aiming point may be set in a center of the image. The tracking controller 109 may estimate a location of the ROI to be set on the target, by estimating a deviation degree in which the target deviates (is offset) from the aiming point due to the vibration of the camera.

The operating system 20 may include the steering device 203 and a display 205.

The steering device 203 may generate a control signal corresponding to a command from a user and deliver the control signal to the controller 107. The steering device 203 may include a firing button, a firearm manipulation button, a camera manipulation button, etc. The steering device 203 may generate a firing signal as the control signal in response to a user pressing on the firing button, and may deliver the firing signal to the controller 107. The steering device 203 may generate a firearm manipulation signal as the control signal in response to the user pressing on the firearm manipulation button, and may deliver the firearm manipulation signal to the controller 107. The steering device 203 may generate a camera manipulation signal as the control signal in response to the user pressing on the camera manipulation button, and may deliver the camera manipulation signal to the controller 107.

The display 205 may display an image captured by the image device 103. The display 205 may display an image captured by the daytime camera and/or the night camera of the image device 103. The display 205 may display state information of the firearm, a target that is set, etc. Also, the display 205 may display distance measuring information measured by the distance measuring device with respect to the target.

According to an embodiment illustrated in FIG. 2A, each of the weapon device 101 and the image device 103 may be driven by the driver 105. According to another embodiment, the weapon device 101 and the image device 103 may be coupled to each other and may be driven together, as illustrated in FIG. 2B. For example, the image device 103 may be fastened to the weapon device 101, and when the weapon device 101 is driven by the driver 105 in response to a control signal of the controller 107 or the tracking controller 109, the image device 103 may be driven and controlled together with the weapon device 101.

Figure 3A:
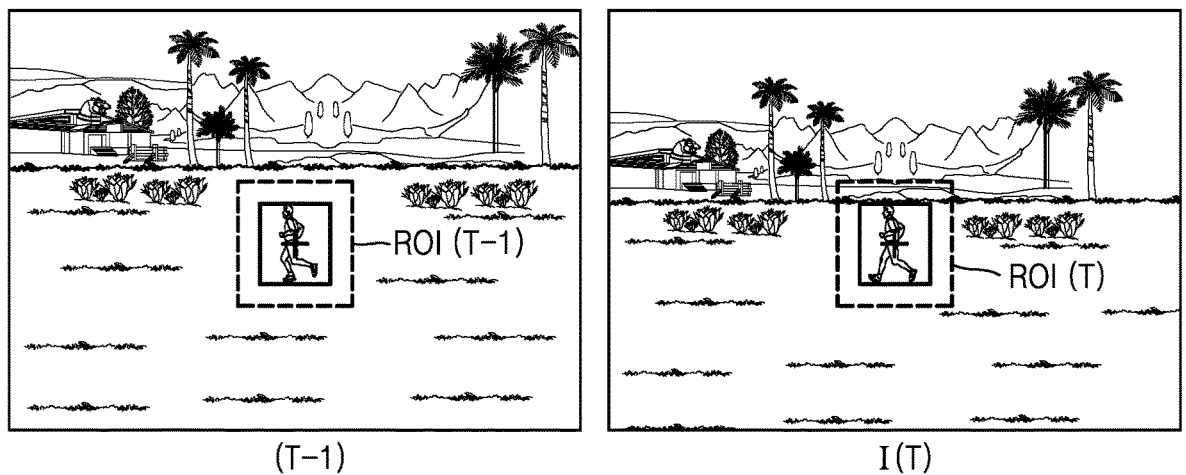
FIG. 3A is an example diagram of a tracking result of a remote-controlled weapon system in a first environment.
Figure 3B:
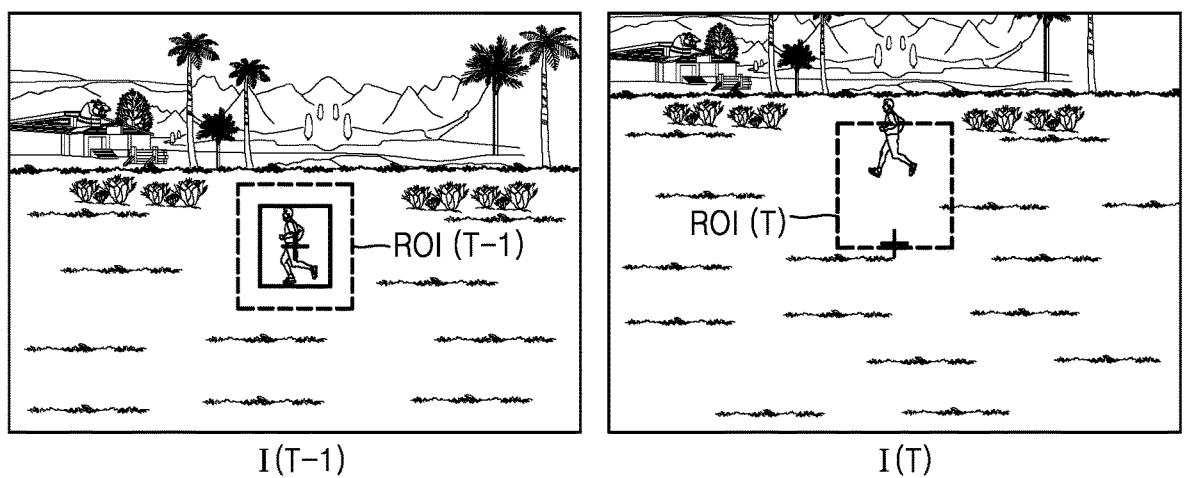
FIG. 3B is an example diagram of a tracking result of a remote-controlled weapon system in a second environment.

FIGS. 3A and 3B are example diagrams of tracking results of the remote-controlled weapon system 1 in different environments. In FIGS. 3A and 3B, the left figures show a previous image I(T−1) and the right figures show a current image I(T).

FIG. 3A is an example diagram of a target tracking result of the remote-controlled weapon system 1 in a situation in which vibration of a camera does not occur. In FIG. 3A, non-broken lines indicate a designated target and dashed lines indicate an ROI that is set on the target. When there is no vibration of the camera, from a result of tracking the target in the previous image I(T−1) and the current image I(T), it is identified that the target is located at an aiming point (a center of the image) and the ROI is set to include the target.

FIG. 3B is an example diagram of a target tracking result of the remote-controlled weapon system 1 in a situation in which vibration of the camera occurs. In FIG. 3B, it is identified that a target deviates from a center of the image and an ROI deviates from the target in the current image I(T), due to vibration of the camera. The remote-controlled weapon system 1 is mounted and operated in a moving platform, and thus, it has to be capable of a tracking operation in situations with high vibration. However, due to irregular surfaces and/or disturbances, such as firing shocks, etc., the vibration of the camera may occur, and a location of the target in the image may be drastically changed. Thus, as illustrated in FIG. 3B, with the deviation of the ROI from the target, the tracking may be failed.

In the remote-controlled weapon system 1 according to an embodiment, the tracking controller 109 may compensate for a location of an ROI that is set on a target, by calculating a pixel movement amount based on vibration of a camera, so that the target may be located within the ROI. Accordingly, the remote-controlled weapon system 1 may track the target without fail even in a situation of high vibration and may match an aiming point with the target.

An amount of a posture change of the camera may be indicated by an amount of a physical rotation of the camera, that is, an amount of a change of a direction angle of the camera. Also, the amount of the change of the direction angle of the camera may be converted into a displacement amount of a pixel unit, that is, a pixel movement amount. For example, an amount of a horizontal rotation of the camera during a time interval between a first image and a second image, that is, an amount of a change of a yaw angle, may correspond to a pixel movement amount in an x direction with respect to a global movement between the first image and the second image. An amount of a vertical rotation of the camera during the time interval between the first image and the second image, that is, an amount of a change of a pitch angle, may correspond to a pixel movement amount in a y direction with respect to a global movement between the first image and the second image. The first image may be a previous image obtained by the camera at a first time point (a (T−1) second), and the second image may be a current image obtained by the camera at a second time point (a (T) second).

The actual posture change amount of the camera may include a posture change amount of the camera in response to a control command instructing a posture change of the camera and a posture change amount of the camera according to vibration of the camera.

$$\Delta m(x,y) = \Delta c(x,y) + \Delta n(x,y) \quad (1)$$

In Equation (1), $\Delta m(x,y)$ is a pixel movement amount (hereinafter, "a first pixel movement amount") corresponding to the actual posture change amount of the camera during a time interval between adjacent two images. Δc(x,y) is a pixel movement amount (hereinafter, "a second pixel movement amount") corresponding to a control command including a posture change amount of the camera to match a target with an aiming point in an image. Δn(x,y) is a pixel movement amount (hereinafter, "a third pixel movement amount") corresponding to a global movement of an image due to vibration of the camera.

Figure 4:
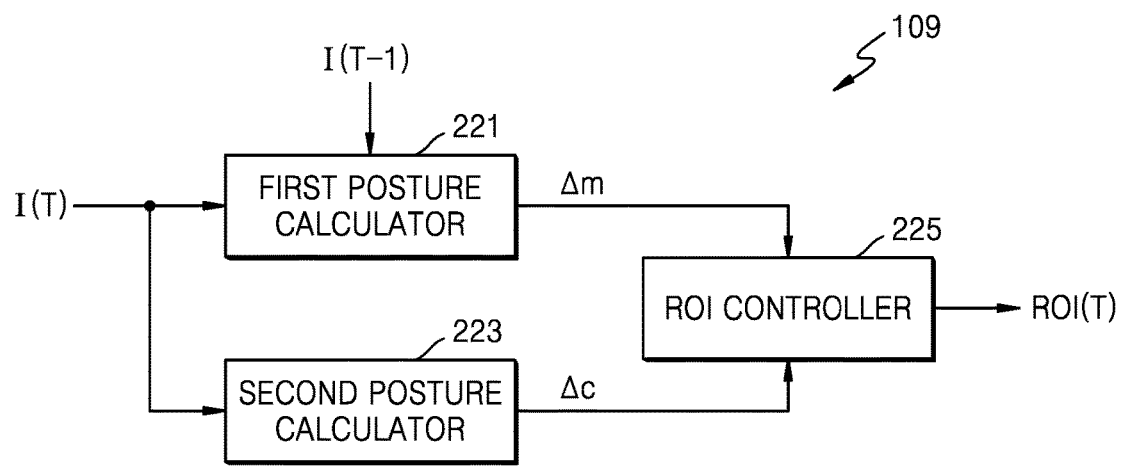
FIG. 4 is a schematic block diagram of a configuration of a tracking controller according to an embodiment.
Figure 5:
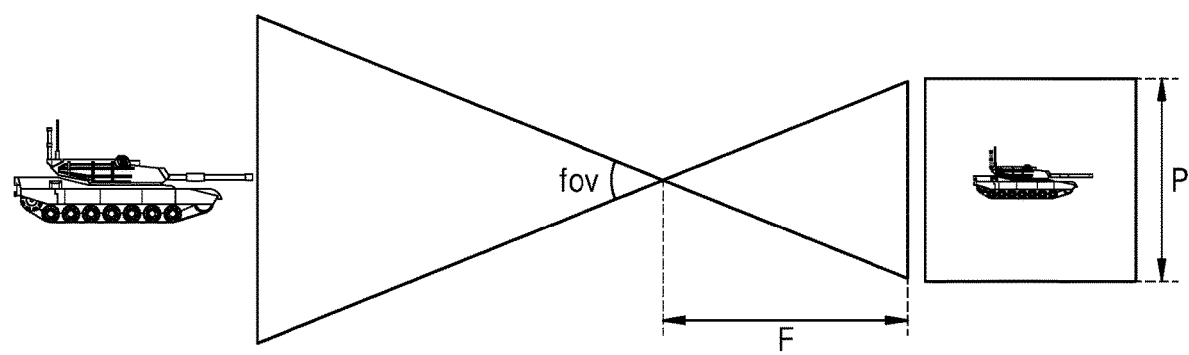
FIG. 5 is an example diagram of a pinhole camera model for calculating a first pixel movement amount, according to an embodiment.
Figure 6:
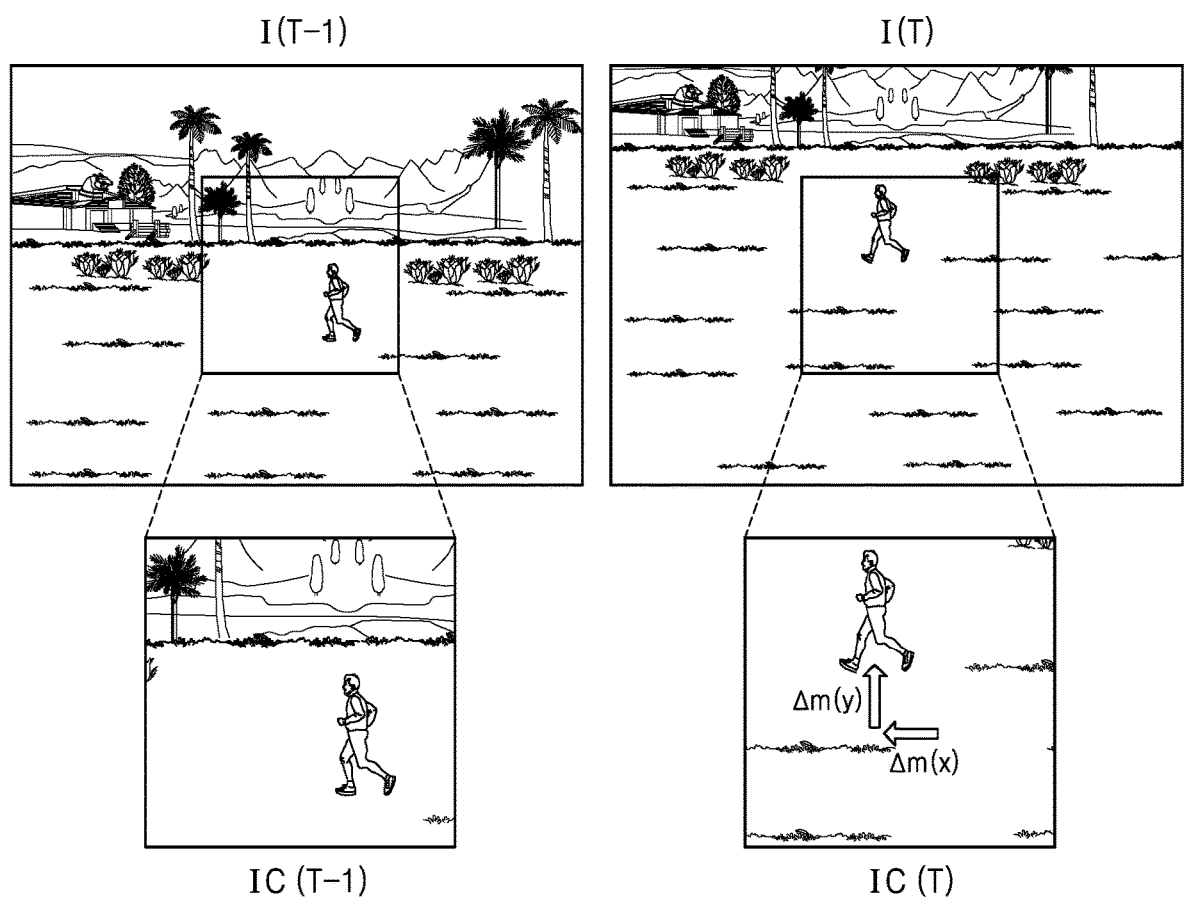
FIG. 6 is an example diagram of an image crop for calculating a first pixel movement amount, according to an embodiment.
Figure 7:
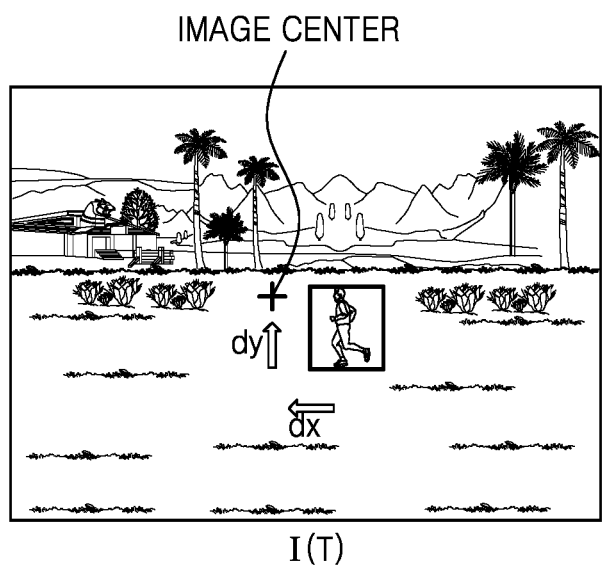
FIG. 7 is a first diagram for describing calculation of a second pixel movement amount, according to an embodiment.
Figure 8:
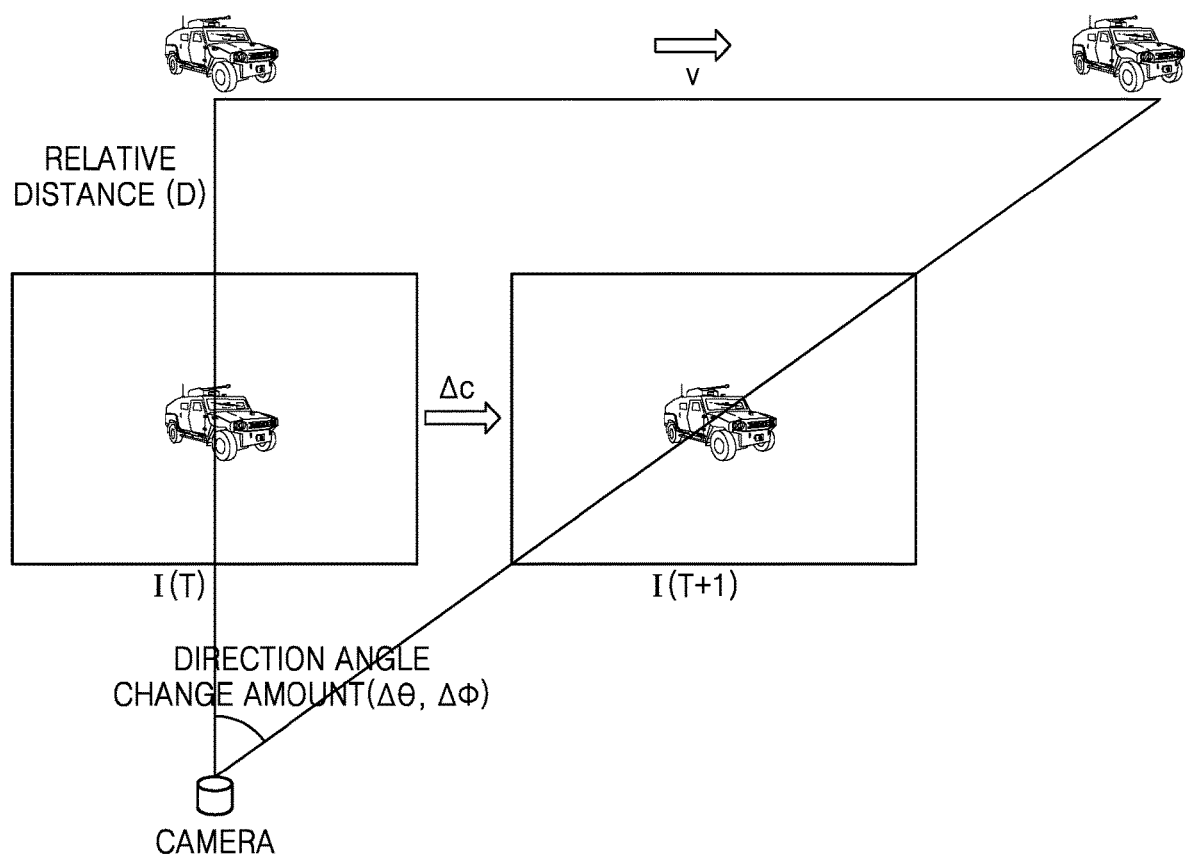
FIG. 8 is a second diagram for describing calculation of a second pixel movement amount, according to an embodiment.
Figure 9:
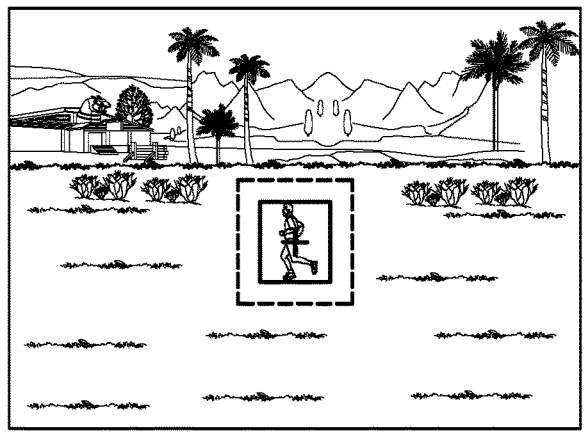
FIG. 9 is a diagram of a target tracking result in an image to which pixel motion compensation based on vibration of a camera is applied, according to an embodiment.
Figure 9:
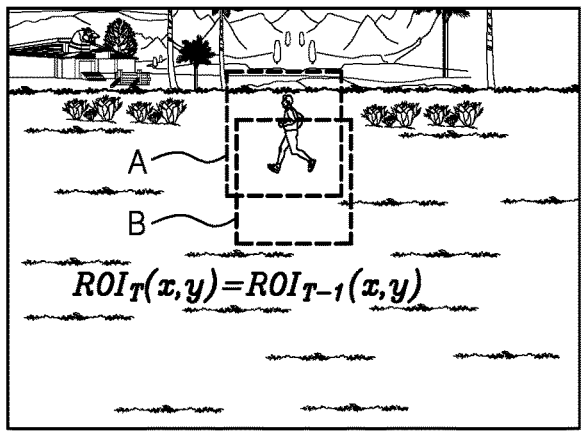
Figure 10:
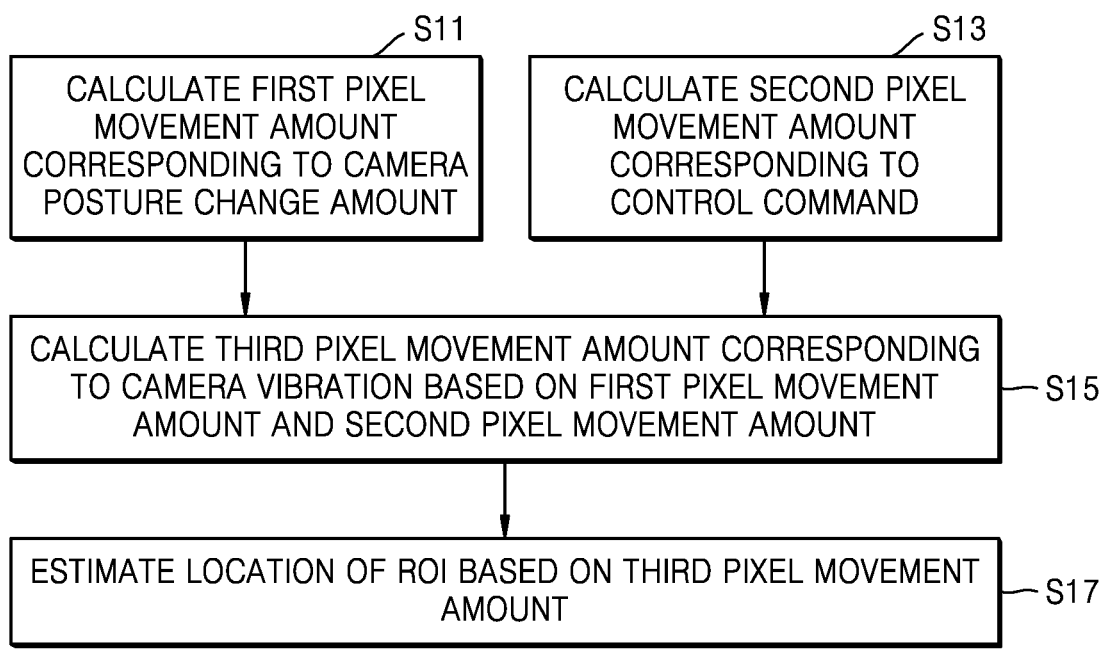
FIG. 10 is a schematic flowchart of a target tracking method of a remote-controlled weapon system, according to an embodiment.

FIG. 4 is a schematic block diagram of a configuration of the tracking controller 109 according to an embodiment. FIG. 5 is an example diagram of a pinhole camera model for calculating the first pixel movement amount, according to an embodiment. FIG. 6 is an example diagram of an image crop for calculating the first pixel movement amount, according to an embodiment. FIGS. 7 and 8 are example diagrams for describing calculation of the second pixel movement amount, according to an embodiment. FIG. 9 is a diagram of a target tracking result in an image to which pixel movement compensation is applied according to vibration of a camera, according to an embodiment. FIG. 10 is a schematic flowchart of a target tracking method of the remote-controlled weapon system 1, according to an embodiment.

Referring to FIG. 4, the tracking controller 109 may include a first posture calculator 221, a second posture calculator 223, and an ROI controller 225. Hereinafter, descriptions will be given by referring to FIGS. 4 and 10.

The first posture calculator 221 may calculate a first pixel movement amount (Δm(x,y)) corresponding to an actual posture change amount of a camera (S11). The first posture calculator 221 may calculate the first pixel movement amount (Δm(x,y)) corresponding to the posture change amount of the camera during a time interval between a first image and a second image. The first posture calculator 221 may calculate the first pixel movement amount (Δm(x,y)) by using an external sensor.

According to an embodiment, the first posture calculator 221 may calculate the first pixel movement amount (Δm(x,y)) by using a posture sensor provided in the firing system 10. The posture sensor may include at least one of a gyro-sensor, an acceleration sensor, an altitude sensor, and a geomagnetic sensor. The posture sensor may measure a yaw angle and a pitch angle of the camera. The first posture calculator 221 may receive, from the posture sensor, a yaw angle and a pitch angle of the camera, which are measured when the first image is captured by the camera, and a yaw angle and a pitch angle of the camera, which are measured when the second image is captured by the camera. The first posture calculator 221 may convert a change amount of the yaw angle and a change amount of the pitch angle during the time interval between the first image and the second image into the first pixel movement amount (Δm(x,y)), according to the Equation 2 below.

$$\Delta m(x) = \Delta\theta_g \times \frac{p_x}{fov_x} \quad (2)$$
$$\Delta m(y) = \Delta\phi_g \times \frac{p_y}{fov_y}$$

Referring to FIG. 5, in Equation 2, $\Delta\theta_g$ indicates the change amount of the yaw angle measured during the time interval between the first image and the second image, $\Delta\phi_g$ indicates the change amount of the pitch angle measured during the time interval between the first image and the second image, $p_x$ indicates a size of a horizontal axis of the second image, $p_y$ indicates a size of a vertical axis of the second image, $fov_x$ indicates a horizontal angle of view (angle of field), and $fov_y$ indicates a vertical angle of view. F is a focal distance. (p/fov) indicates a size of a pixel in an image.

According to another embodiment, the first posture calculator 221 may calculate the first pixel movement amount (Δm(x,y)) by using an image sensor, that is, a camera, provided in the firing system 10. The first posture calculator 221 may calculate a global movement of an image that is calculated via image registration between a pair of temporally adjacent images obtained by the camera, as the first pixel movement amount (Δm(x,y)). For example, the first posture calculator 221 may calculate the global movement of the image that is calculated via the image registration between the first image and the second image, as the first pixel movement amount (Δm(x,y)). In this case, the first pixel movement amount is calculated by using image information, and thus, the firing system 10 may not have to include an additional posture sensor.

The first posture calculator 221 may calculate the first pixel movement amount (Δm(x,y)) via registration between crop images extracted from corresponding areas of the first image I(T−1) and the second image I(T), as illustrated in FIG. 6. For example, the first posture calculator 221 may calculate the first pixel movement amount (Δm(x,y)) via image registration between a first crop image IC(T−1) extracted from the first image I(T−1) and a second crop image IC(T) extracted from the second image I(T).

An image movement (a global movement) between two images may be indicated as a phase difference in a frequency domain as shown in the following equation (3), and when inverse Fourier transform is performed on the phase difference as shown in the following Equation (4), an impulse, which is moved by dx, dy, is shown. Thus, when a parallel movement amount in a space is converted into a frequency domain by using fast Fourier transform (FFT) and a value obtained through the conversion is inversely converted, an impulse value is obtained, so that a pixel movement amount d(x,y) may be calculated. Here, the pixel movement amount d(x,y) corresponds to the first pixel movement amount (Δm(x,y)).

$$f(x - x_0, y - y_0) \underset{F.T.}{\longleftrightarrow} F(\omega_x, \omega_y)e^{-j2\pi(x_0\omega_x + y_0\omega_y)} \quad (3)$$

$$\begin{matrix} f_1 \underset{F.T.}{\longleftrightarrow} |F_1|e^{j\phi_1} \\ f_2 \underset{F.T.}{\longleftrightarrow} |F_2|e^{j\phi_2} \end{matrix} \searrow e^{j(\phi_1 - \phi_2)} \xrightarrow{\text{Inverse transform}} d(x, y) \quad (4)$$

The second posture calculator 223 may calculate the second pixel movement amount (Δc(x,y)) in response to a control command (S13). The control command may include a camera posture change amount to position the target at an aiming point. The control command is a signal to control the camera driver to move the camera in a certain direction from among upward, downward, right, and left directions. The control command may include a pitch angle and a yaw angle.

The second posture calculator 223 may detect a target in an image. The second posture calculator 223 may calculate a yaw angle change amount and a pitch angle change amount of the camera to locate the detected target at an aiming point (a center of the image). For example, the second posture calculator 223 may calculate the yaw angle change amount and the pitch angle change amount of the camera, to position a center of the target detected in the second image at the center of the image. The following Equation (5) describes the relationship between the yaw angle change amount ($\Delta\theta_c$) and the pitch angle change amount ($\Delta\phi_c$) included in the control command, and the second pixel movement amount ($\Delta c(x,y)$).

$$\Delta c(x) = \Delta\theta_c \times \frac{p_x}{fov_x} \quad (5)$$
$$\Delta c(y) = \Delta\phi_c \times \frac{p_y}{fov_y}$$

According to an embodiment, as illustrated in FIG. 7, the second posture calculator 223 may calculate the second pixel movement amount ($\Delta c(x,y)$) as a change amount (dx) in an x direction corresponding to the yaw angle change amount of the camera and a change amount (dy) in a y direction corresponding to the pitch angle change amount of the camera, whereby the target is moved to the aiming point (the center of the image) in the image.

According to another embodiment, the second posture calculator 223 may estimate a location of the target in a next image based on a speed V of the target detected in the image. FIG. 8 describes the relationship between a position change ($\Delta c(x,y)$) of the target and the speed (V) of the target when the target is moved from the left side to the right side during a predetermined time period.

The second posture calculator 223 may calculate a position change amount of the target in an orthogonal coordinate system by applying, to a dynamic model, a relative distance (D) between the camera and the target, and a direction angle change amount of the camera to change the posture of the camera from a current target position (a left position to an estimated target position (a right position), that is, a posture change amount of the camera (for example, the yaw angle change amount ($\Delta\theta_c$) and the pitch angle change amount ($\Delta\phi_c$) The relative distance D between the camera and the target may be measured by using a distance measuring device. The position change amount of the target may be used as the second pixel movement amount ($\Delta c(x,y)$).

The second posture calculator 223 may generate a control command including the estimated posture change amount of the camera (the yaw angle change amount and the pitch angle change amount) or a yaw angle and a pitch angle of the camera, which are changed. The control command may be output to the driver 105 (FIG. 2) as a control signal, and the driver 105 may change the posture of the camera in response to the control command. An image obtained by the camera, the posture of which is changed according to the control command generated based on the position of the target detected in the second image may be a next image of the second image.

However, even when the control command including the posture change amount ($\Delta\theta_c, \Delta\phi_c$) of the camera calculated by the second posture calculator 223 is delivered to the driver 105, the actual value output to the camera by the driver 105 may be different from the control command, due to motor inertia and/or load.

Thus, the second posture calculator 223 according to an embodiment may adjust the second pixel movement amount ($\Delta c(x,y)$) corresponding to the control command to a second pixel movement amount ($\Delta c(x,y)'$) based on the actual output of the driver 105, as shown in the following Equation (6). The second posture calculator 223 may calculate the second pixel movement amount ($\Delta c(x,y)'$) based on the output information of the driver 105. The second posture calculator 223 may receive, from an encoder, feedback of the output of the driver 105 driven according to the control command generated according to Equation (5), that is, the yaw angle change amount) ($\Delta\theta_f$) and the pitch angle change amount ($\Delta\phi_f$) and may convert the received feedback into the second pixel movement amount ($\Delta c(x,y)'$).

$$\Delta c(x)' = \Delta\theta_f \times \frac{p_x}{fov_x} \quad (6)$$
$$\Delta c(y)' = \Delta\phi_f \times \frac{p_y}{fov_y}$$

The ROI controller 225 may calculate a third pixel movement amount ($\Delta n(x,y)$) due to vibration of the camera, based on the first pixel movement amount ($\Delta m(x,y)$) received from the first posture calculator 221 and the second pixel movement amount ($\Delta c(x,y)'$) received from the second posture calculator 223 (S15).

The ROI controller 225 may calculate a difference between the first pixel movement amount ($\Delta m(x,y)$) and the second pixel movement amount ($\Delta c(x,y)'$) as the third pixel movement amount ($\Delta n(x,y)$), as shown in the following Equation (7). For example, the ROI controller 225 may calculate the difference between the first pixel movement amount ($\Delta m(x,y)$) calculated in the second image and the second pixel movement amount ($\Delta c(x,y)'$) calculated in the second image as the third pixel movement amount ($\Delta n(x,y)$) of the second image, as shown in the following Equation (7).

$$\Delta n(x,y) = \Delta m(x,y) - \Delta c(x,y) \quad (7)$$

The following Equation (8) indicates calculating of the third pixel movement amount ($\Delta n(x,y)$) by using a posture sensor, and the following Equation (9) indicates calculating of the third pixel movement amount ($\Delta n(x,y)$) by using image registration.

$$\Delta n(x) = \left(\Delta\theta_g \times \frac{p_x}{fov_x}\right) - \left(\Delta\theta_f \times \frac{p_x}{fov_x}\right) \quad (8)$$
$$\Delta n(y) = \left(\Delta\phi_g \times \frac{p_y}{fov_y}\right) - \left(\Delta\phi_f \times \frac{p_y}{fov_y}\right)$$

$$\Delta n(x) = (dx) - \left(\Delta\theta_f \times \frac{p_x}{fov_x}\right) \quad (9)$$
$$\Delta n(y) = (dy) - \left(\Delta\phi_f \times \frac{p_y}{fov_y}\right)$$

The ROI controller 225 may estimate a location of an ROI to be set on the target in the second image, based on the third pixel movement amount ($\Delta n(x,y)$) (S17). The ROI controller 225 may estimate a location of an ROI ($ROI_T(x,y)$) of the second image by compensating for a location of an ROI ($ROI_{T-1}(x,y)$) of the first image by the third pixel movement amount ($\Delta n(x,y)$) as shown in the following Equation (10).

$$ROI_T(x,y) = ROI_{T-1}(x,y) + \Delta n(x,y) \quad (10)$$

According to an embodiment, the ROI controller 225 may compare the third pixel movement amount ($\Delta n(x,y)$) with a predetermined threshold value. When the third pixel movement amount ($\Delta n(x,y)$) calculated in the second image is greater than the threshold value, the ROI controller 225 may estimate the location of the ROI of the second image by adding the third pixel movement amount (Δn(x,y)) to the location of the ROI of the first image. When the third pixel movement amount (Δn(x,y)) calculated in the second image is equal to or less than the threshold value, the ROI controller 225 may ignore the third pixel movement amount (Δn(x,y)) and may not reflect the vibration of the camera, to estimate the location of the ROI of the first image as the location of the ROI of the second image. When the third pixel movement amount (Δn(x,y)) is equal to or less than the threshold value, the vibration of the camera may be ignored, and thus, a target successfully tracked may be located in the center of an image. Thus, it may be estimated that a location (ROI (T)) of the current ROI corresponds to a location (ROI (T−1)) of the previous ROI.

In FIG. 9, "A" refers to an ROI (ROI$_T$(x,y)) of a current image to which pixel movement compensation due to vibration of the camera is applied, according to an embodiment. In such case, a target is located in the ROI. On the contrary, "B" refers to an ROI of a current image having no pixel movement compensation due to vibration of the camera, according to a comparative embodiment. In such case, only a portion of a target is located in the ROI and tracking of the target fails.

Figure 11:
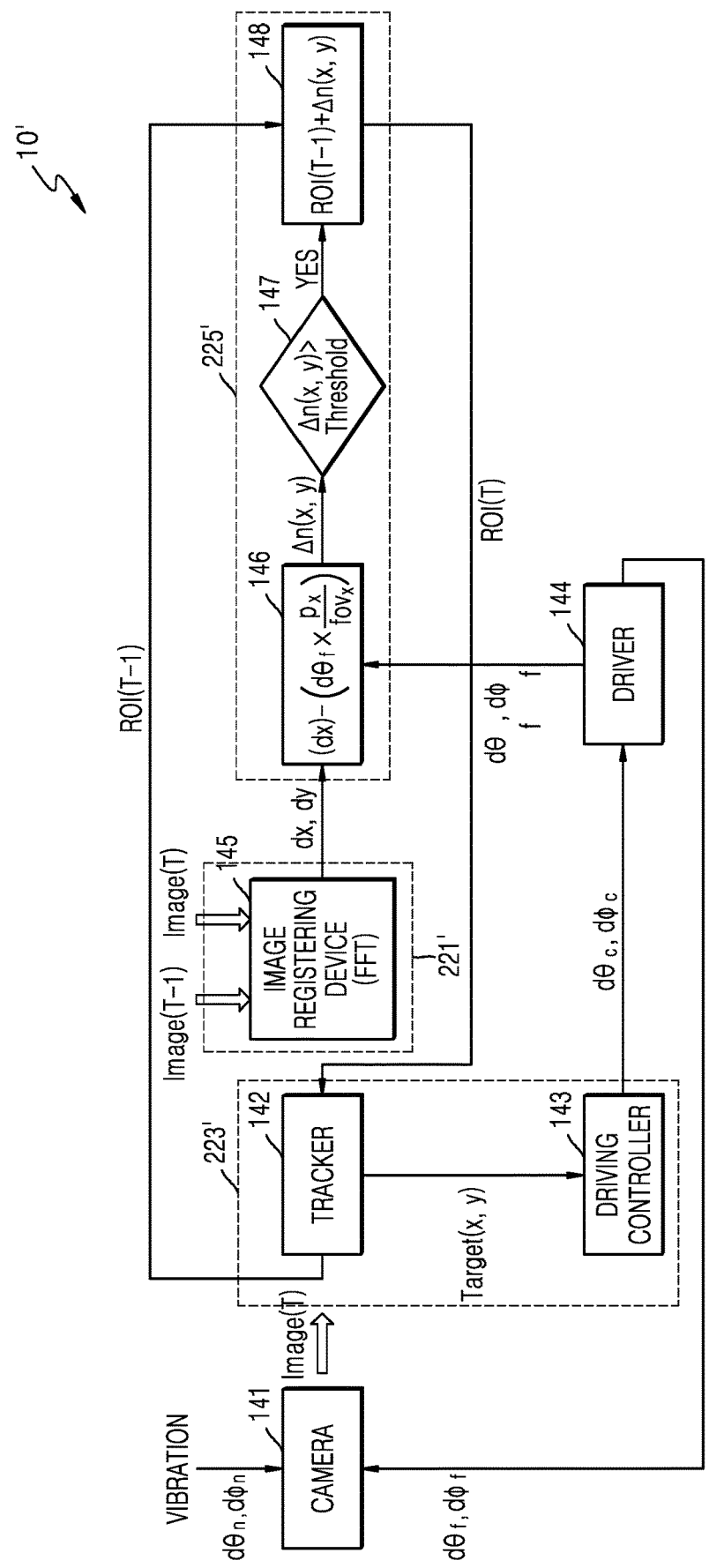
FIG. 11 is a schematic block diagram of a configuration of a firing system according to an embodiment.

FIG. 11 is a schematic block diagram of a configuration of a firing system 10' according to an embodiment.

Referring to FIG. 11, the firing system 10' according to an embodiment may include a camera 141, a first posture calculator 221', a second posture calculator 223', a ROI controller 225', and a driver 144. The first posture calculator 221' may include an image registration device 145. The second posture calculator 223' may include a tracker 142 and a driving controller 143. The ROI controller 225' may include a third posture detector 146, an evaluator 147, and an ROI estimator 148. Hereinafter, aspects that are the same as the aspects described above will not be described in detail.

The camera 141 may change the posture via rotation based on a change amount (dθ$_f$, dφ$_f$) included in a control command. Here, the rotation of the camera 141 may include the rotation (dθ$_n$, dφ$_n$) due to vibration. The camera 141 may obtain a current image Image(T) in a posture changed after the rotation.

The image registration device 145 may calculate a first pixel movement amount (dx, dy) of the current image Image(T) via image registration of a previous image Image (T−1) and the current image Image(T).

The tracker 142 may detect, in the current image Image (T), a location of a target designated by an operator. The tracker 142 may set an ROI on the target and automatically adjust a size of the ROI according to a size of the target. The tracker 142 may detect the target in the current image Image(T) and output a location Target(x,y) of the detected target to the driving controller 143.

The driving controller 143 may calculate a posture change amount (dθ$_c$, dφ$_c$) to position the target in an aiming point in the current image Image(T) and may generate a control command including the posture change amount (dθ$_c$, dφ$_c$). The driver 144 may rotate to change the posture of the camera 141 according to the control command. Also, outputs (dθ$_f$, dφ$_f$) of the driver 144 may be detected by an encoder. The outputs (dθ$_f$, dφ$_f$) of the driver 144 that are detected by the encoder may be different from the camera posture change amount (dθ$_c$, dφ$_c$) of the control command that is output from the driving controller 143, due to motor inertia and load.

The third posture detector 146 may calculate a third pixel movement amount (Δn(x,y)), which is a difference between the first pixel movement amount (dx, dy) of the current image Image(T) received from the image registration device 145 and a second pixel movement amount (dθ$_f$×p$_x$/fov$_x$, dφ$_f$×p$_y$/fov$_y$) obtained by converting the outputs (dθ$_f$, dφ$_f$) of the driver 144.

The evaluator 147 may compare the third pixel movement amount (Δn(x,y)) with a predetermined threshold value (Threshold), and when the third pixel movement amount (Δn(x,y)) is greater than the threshold value (Threshold), the ROI estimator 148 may estimate a location (ROI(T)) of the current ROI via a location (ROI(T−1)+Δn(x,y)) calculated by compensating for a location (ROI(T−1)) of the previous ROI by the third pixel movement amount (Δn(x,y)).

When the third pixel movement amount (Δn(x,y)) is equal to or less than the threshold value (Threshold), the vibration of the camera may be ignored, and thus, the target successfully tracked may be located in the center of an image, and thus, the location (ROI(T)) of the current ROI may correspond to the location (ROI(T−1)) of the previous ROI.

The camera 141 may change the posture via rotation according to the outputs (Δθ$_f$, Δφ$_f$) of the driver 144 and may obtain a next image in the changed posture.

Figure 12:
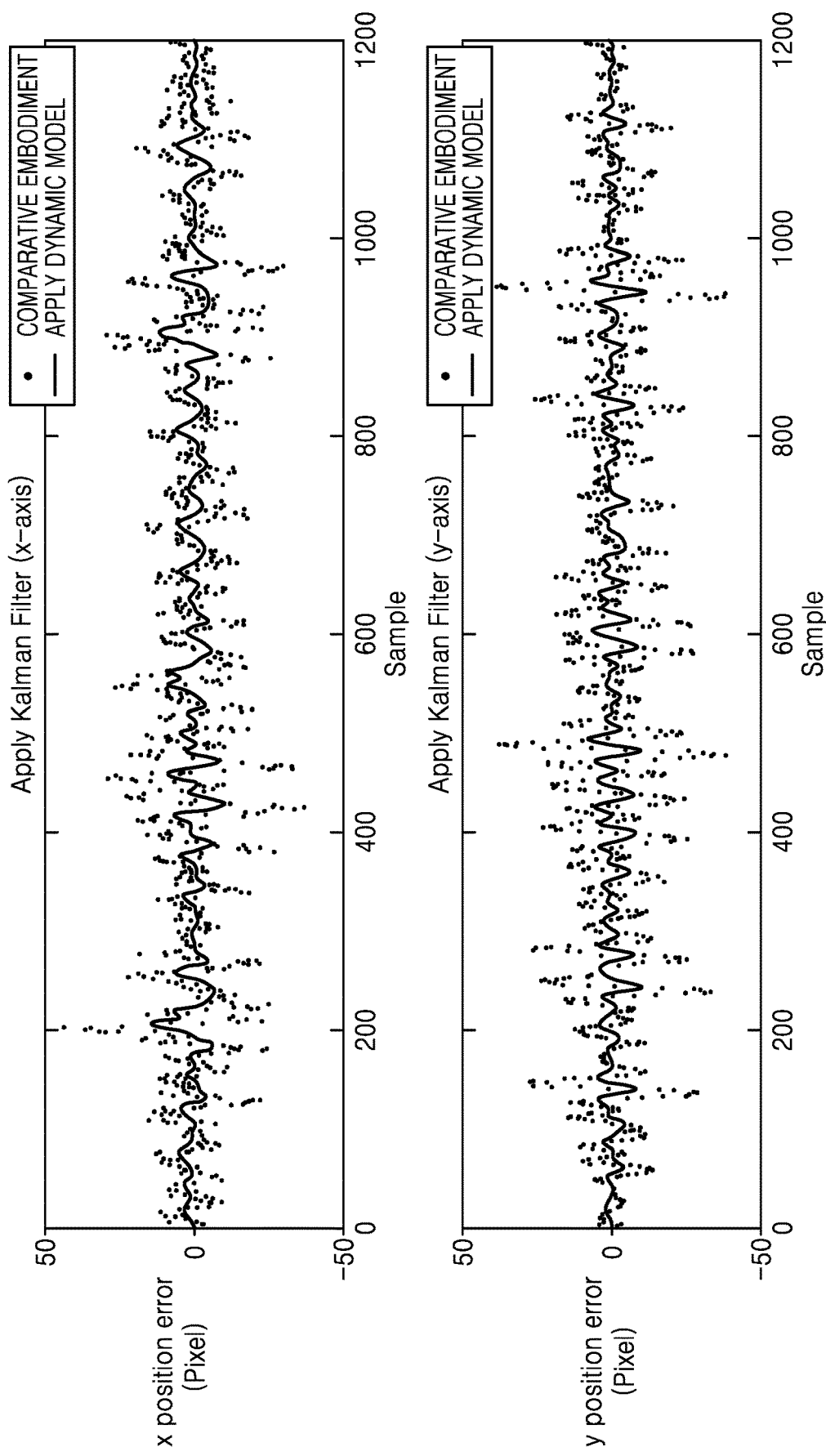
FIG. 12 is a diagram of an aiming error, which is a difference between a target coordinate and an aiming point coordinate, when a simulation is executed according to a control command for having a target and an aiming point correspond to each other via the method illustrated in FIG. 8.

FIG. 12 is a diagram of an aiming error, which is a difference between a coordinate of a target and a coordinate of an aiming point, when a simulation is executed according to a control command to match the target with the aiming point by using the method illustrated in FIG. 8. The coordinate of the target may be a central coordinate of the target and the coordinate of the aiming point may be a central coordinate of an image. The simulation is executed by using a Kalman filter.

As illustrated in FIG. 12, when the aiming point is matched with a location of the target, the location being estimated based on a speed of the target by using a dynamic model against an aiming error (a comparative embodiment) in an image due to vibration of a camera, the aiming error may be decreased.

A remote-controlled weapon stations (RCWS) or the remote-controlled weapon system 1 may be a weapon system in which an operator in a protected platform may remotely operate the firing system 10 in a wired or a wireless manner, and a threatening target is observed and automatically tracked, a distance of the threatening target is measured, a ballistic missile is automatically corrected, and an aimed shot is fired. The weapon system may be operated in 55 countries worldwide. The remote-controlled weapon system 1 may be mounted in a moving platform in an open field/a rough ground environment and may track a moving target, and thus, high tracking robustness is required.

A method of increasing a size of a tracking area (an ROI) for solving the problem of a target movement due to vibration of a camera may deteriorate the tracking performance, because a ratio of background information to a target is increased in a tracking area.

The remote-controlled weapon system 1 according to an embodiment may remove the vibration occurring due to maneuvering and firing shocks, and thus, tracking robustness may be improved to improve tracking/firing performance.

The remote-controlled weapon system 1 according to an embodiment may continually perform a tracking operation in an environment in which a coordinate of a target is drastically changed due to a frequent change in a shape and a size of the target, vibration due to an irregular surface, or a firing shock. Thus, the tracking robustness may be increased.

The remote-controlled weapon system 1 according to embodiments may be mounted in a moving platform in an open field/a rough ground environment and may strongly track a moving target.

At least one of the components, elements, modules or units (collectively "components" in this paragraph) represented by a block in the drawings and/or described in the description, such as a controller, may be embodied as various numbers of hardware, software, and/or firmware structures that execute respective functions described above, according to an example embodiment. For example, the first posture calculator 221, the second posture calculator 223, and the ROI controller 225 may be implemented by at least one processor and memory storing computer code. The computer code, when executed by the at least one processor, may cause the at least one processor to perform one or more operations of the present disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure.

What is claimed is:

1. A remote-controlled weapon system mounted in a moving platform, the remote-controlled weapon system comprising:
    at least one processor that implements:
        a first posture calculator configured to calculate a first pixel movement amount corresponding to a posture change amount of a camera during a time interval between a first image and a second image, received after the first image;
        a second posture calculator configured to calculate a second pixel movement amount corresponding to a control command for changing a posture of the camera to match a moving target, detected from the second image, with an aiming point; and
        a region of interest (ROI) controller configured to calculate a third pixel movement amount corresponding to vibration of the camera based on the first pixel movement amount and the second pixel movement amount, and estimate a location of an ROI that is to be set on the moving target of the second image, based on the third pixel movement amount.

2. The remote-controlled weapon system of claim 1, wherein the second posture calculator is further configured to estimate a next location of the moving target based on a speed of the moving target, and calculate the second pixel movement amount corresponding to the control command such that the posture of the camera is changed to make the estimated next location of the moving target correspond to the aiming point.

3. The remote-controlled weapon system of claim 2, wherein the second posture calculator is further configured to receive an output of a driver configured to drive the camera in response to the control command, and adjust a pixel movement amount, which corresponds to the output of the driver, as the second pixel movement amount.

4. The remote-controlled weapon system of claim 1, wherein the first posture calculator is further configured to receive the posture change amount of the camera during the time interval between the first image and the second image from a posture sensor.

5. The remote-controlled weapon system of claim 1, wherein the first posture calculator is further configured to calculate a global movement of an image, calculated by registering at least a portion of the first image and the second image, as the first pixel movement amount.

6. The remote-controlled weapon system of claim 5, wherein the first posture calculator is further configured to calculate the first pixel movement amount by registering crop images of corresponding regions of the first image and the second image.

7. The remote-controlled weapon system of claim 1, wherein the ROI controller is further configured to estimate the location of the ROI that is to be set on the second image by adjusting a location of an ROI that is set on the first image by the third pixel movement amount, the third pixel movement amount corresponding to a difference between the first pixel movement amount and the second pixel movement amount.

8. The remote-controlled weapon system of claim 7, wherein the ROI controller is further configured to:
    based on the third pixel movement amount being equal to or less than a threshold value, estimate the location of the ROI that is set on the first image as the location of the ROI to be set on the second image, and
    based on the third pixel movement amount being greater than the threshold value, estimate a location calculated by adjusting the location of the ROI that is set on the first image by the third pixel movement amount as the location of the ROI to be set on the second image.

9. The remote-controlled weapon system of claim 1, wherein the controller is further configured to generate the first pixel movement amount and the second pixel movement amount by converting an amount of change in a direction angle of the camera into a displacement of a pixel.

10. A method of tracking a moving target, performed by a remote-controlled weapon system that includes a camera and that is mounted in a moving platform, the method comprising:
    calculating a first pixel movement amount corresponding to a posture change amount of the camera during a time interval between a first image and a second image, that is obtained after the first image;
    calculating a second pixel movement amount corresponding to a control command for changing a posture of the camera to match, with an aiming point, the moving target, wherein the moving target is detected from the second image;
    calculating a third pixel movement amount corresponding to vibration of the camera based on the first pixel movement amount and the second pixel movement amount; and
    estimating a location of a region of interest (ROI) that is to be set on the moving target of the second image, based on the third pixel movement amount.

11. The method of claim 10, wherein the calculating of the second pixel movement amount comprises estimating a next location of the moving target based on a speed of the moving target, and calculating the second pixel movement amount, which corresponds to the control command, such that the posture of the camera is changed to match the estimated next location of the moving target with the aiming point.

12. The method of claim 11, wherein the calculating of the second pixel movement amount comprises receiving an output of a driver configured to drive the camera in response to the control command, and adjusting a pixel movement amount corresponding to the output of the driver as the second pixel movement amount.

13. The method of claim 10, wherein the calculating of the first pixel movement amount comprises receiving, from a posture sensor, the posture change amount of the camera during the time interval between the first image and the second image.

14. The method of claim 10, wherein the calculating of the first pixel movement amount comprises calculating, by registering at least a portion of the first image and the second image, a global movement of an image as the first pixel movement amount.

15. The method of claim 14, wherein the calculating of the first pixel movement amount comprises calculating the global movement by registering crop images of corresponding regions of the first image and the second image.

16. The method of claim 10, wherein the estimating of the location of the ROI comprises estimating the location of the ROI that is to be set on the second image by adjusting a location of an ROI that is set on the first image by the third pixel movement amount, the third pixel movement amount corresponding to a difference between the first pixel movement amount and the second pixel movement amount.

17. The method of claim 16, wherein the estimating of the location of the ROI comprises:
based on determining the third pixel movement amount being equal to or less than a threshold value, estimating the location of the ROI that is set on the first image as the location of the ROI to be set on the second image.

18. The method of claim 16, wherein the estimating of the location of the ROI comprises:
based on determining the third pixel movement amount being greater than a threshold value, estimating a location calculated by adjusting the location of the ROI that is set on the first image by the third pixel movement amount as the location of the ROI to be set on the second image.

19. The method of claim 10, wherein the calculating the first pixel movement amount and the calculating the second pixel movement amount comprise converting an amount change in a direction angle of the camera into a displacement of a pixel to generate the first pixel movement amount and the second pixel movement amount, respectively.

20. A non-transitory computer-readable medium storing computer code that is configured to, when executed by at least one processor of a remote-controlled weapon system that is mounted in a moving platform, cause the at least one processor to:
calculate a first pixel movement amount corresponding to a posture change amount of a camera, of the remote-controlled weapon system, during a time interval between a first image and a second image, that is obtained after the first image;
calculate a second pixel movement amount corresponding to a control command for changing a posture of the camera to match, with an aiming point, a moving target detected from the second image;
calculate a third pixel movement amount corresponding to vibration of the camera based on the first pixel movement amount and the second pixel movement amount; and
estimate a location of a region of interest (ROI) that is to be set on the moving target of the second image, based on the third pixel movement amount.

* * * * *